(12) United States Patent
Peskov et al.

(10) Patent No.: US 7,180,070 B2
(45) Date of Patent: Feb. 20, 2007

(54) RADIATION DETECTOR

(75) Inventors: Vladimir Peskov, Lidingö (SE); Tom Francke, Sollentuna (SE)

(73) Assignee: XCounter AB, Danderyd (SE)

( * ) Notice: Subject to any disclaimer, the term of this patent is extended or adjusted under 35 U.S.C. 154(b) by 265 days.

(21) Appl. No.: 10/986,026

(22) Filed: Nov. 12, 2004

(65) Prior Publication Data
US 2006/0071168 A1    Apr. 6, 2006

(30) Foreign Application Priority Data
Oct. 5, 2004    (SE) .................................. 0402395

(51) Int. Cl.
| G01T 1/20 | (2006.01) |
| G01T 1/24 | (2006.01) |
| G01T 1/185 | (2006.01) |

(52) U.S. Cl. ............ 250/367; 250/370.09; 250/370.11; 250/382

(58) Field of Classification Search ............ 250/361 R, 250/362, 363.01, 363.02, 363.04, 363.05, 250/364, 365, 367, 370.01, 370.08, 370.09, 250/370.11, 374
See application file for complete search history.

(56) References Cited

U.S. PATENT DOCUMENTS

| 4,670,656 | A |   | 6/1987  | Bolon |
| 5,311,010 | A |   | 5/1994  | Kruger |
| 5,391,879 | A | * | 2/1995  | Tran et al. .................. 250/367 |
| 5,521,956 | A |   | 5/1996  | Charpak |
| 5,594,253 | A | * | 1/1997  | Bueno et al. ............ 250/486.1 |
| 5,693,947 | A |   | 12/1997 | Morton |
| 6,118,125 | A |   | 9/2000  | Carlson et al. |
| 6,337,482 | B1 |  | 1/2002  | Francke |
| 6,373,065 | B1 |  | 4/2002  | Francke et al. |
| 6,385,282 | B1 |  | 5/2002  | Francke et al. |
| 6,414,317 | B1 |  | 7/2002  | Francke et al. |
| 6,476,397 | B1 |  | 11/2002 | Francke |

(Continued)

FOREIGN PATENT DOCUMENTS

WO    WO 97/29507    8/1997

(Continued)

OTHER PUBLICATIONS

International Search Report for corresponding International Application No. PCT/SE2005/001410 dated Dec. 20, 2005.

(Continued)

*Primary Examiner*—David Porta
*Assistant Examiner*—David S. Baker
(74) *Attorney, Agent, or Firm*—Harness, Dickey & Pierce, P.L.C.

(57) ABSTRACT

A radiation detector for imaging a sheet-shaped beam (11) of ionizing radiation comprises an electron multiplication chamber (12) filled with a medium for electron multiplication; and a solid multichannel structure (14) arranged in the path of the sheet-shaped beam within the chamber, wherein the structure liberates electrons (16a) in response to being exposed to the radiation. An electron detecting means (17d) is provided for detecting the electrons spatially resolved to thereby image the sheet-shaped beam. The structure (14) is of a scintillating material, so that said the structure emits scintillating light in response to being exposed to the radiation; and detecting means (19–20) are provided for detecting scintillating light (18) emitted from the structure.

17 Claims, 2 Drawing Sheets

U.S. PATENT DOCUMENTS

| | | |
|---|---|---|
| 6,477,223 B1 | 11/2002 | Francke |
| 6,518,578 B1 | 2/2003 | Francke et al. |
| 6,522,722 B1 | 2/2003 | Francke |
| 6,546,070 B1 | 4/2003 | Francke |
| 6,556,650 B2 | 4/2003 | Francke |
| 6,600,804 B2 | 7/2003 | Francke et al. |
| 6,627,897 B1 * | 9/2003 | Francke et al. .......... 250/385.1 |
| 6,784,436 B2 | 8/2004 | Francke et al. |
| 6,794,656 B2 | 9/2004 | Francke et al. |
| 2004/0099810 A1 | 5/2004 | Gerstmayer |

FOREIGN PATENT DOCUMENTS

| | | |
|---|---|---|
| WO | WO 00/50922 | 8/2000 |

OTHER PUBLICATIONS

International-Type Search Report for corresponding Swedish Application No. 0402395-8 dated Apr. 20, 2005.

* cited by examiner

RADIATION DETECTOR

FIELD OF THE INVENTION AND PRIOR ART

The invention relates to a radiation detector for imaging a sheet-shaped beam of ionizing radiation, comprising an entrance window structure, through which said sheet-shaped beam of ionizing radiation is entered;

an electron multiplication chamber filled with a medium for electron multiplication;

a solid mechanical structure arranged in the path of said sheet-shaped beam of ionizing radiation within said electron multiplication chamber, and provided to liberate electrons in response to being exposed to said sheet-shaped beam of ionizing radiation, said solid mechanical structure including multiple channels extending in a direction generally orthogonal to the plane of said sheet-shaped beam of ionizing radiation and being filled with said medium for electron multiplication, so that electrons liberated from solid mechanical structure can produce multiple electrons in said multiple channels;

an electrode arrangement for drifting, and optionally avalanche amplifying, said multiple electrons in said direction generally orthogonal to the plane of said sheet-shaped beam of ionizing radiation; and a first electron detecting device for detecting said multiple electrons spatially resolved to thereby image said sheet-shaped beam of ionizing radiation.

Such a detector is known from the embodiment described with reference to FIGS. 3a–d in U.S. Pat. No. 5,521,956 issued to G. Charpak.

SUMMARY OF THE INVENTION

The prior art radiation detector is acknowledged to have high efficiency, and high spatial resolution. However, the radiation detector has a serious disadvantage since the radiation energy information is lost and as a result the detector has no energy resolution.

This disadvantage is remedied by a radiation detector of the initially defined kind, wherein the solid mechanical structure is of a scintillating material, so that the solid mechanical structure emits scintillating light in response to being exposed to the ionizing radiation, and detecting means are provided for detecting scintillating light emitted from the solid mechanical structure.

Hereby, most of the deposit energy will be converted to scintillation light, whereas only a small fraction of the deposit energy will be converted to delta electrons that escape into the channels of the solid mechanical structure. By detecting the scintillation light, the absorbed energy can be accurately determined, and by detecting freed electrons created by the delta electrons, position information of high resolution can be obtained.

The scintillating material may be a scintillating plastic, NaI, CsI, $BaF_2$, or virtually any other solid scintillating material. Preferably, the solid mechanical structure is essentially transparent to the scintillating light that it emits.

In one embodiment of the invention, the scintillating light detecting means is arranged to detect scintillating light propagating in the plane of the sheet-shaped beam of ionizing radiation.

In another embodiment of the invention, the scintillating light detecting means is arranged to detect scintillating light propagating in a direction essentially opposite to the direction in which the electrons are accelerated in the radiation detector.

In yet another embodiment of the invention, the scintillating light detecting means comprises a photocathode for converting the scintillating light to electrons, which are detected together with the freed electrons created by the delta electrons by the electron detecting means of the radiation detector.

In still another embodiment of the invention, the above photocathode is not only provided for converting the scintillating light to electrons, but also provided for converting visible or UV light emitted as a result of the freed electrons created by the delta electrons interacting with the detector medium, to electrons. Further, both the electrons derivable from the scintillating light and those derivable from the delta electrons are detected by the electron detecting means of the radiation detector.

In the two latter embodiments, signals originating from the scintillating light and signals originating from the delta electrons are distinguished in the detector by their different spatial distributions. The signals originating from the scintillating light are typically spread over several detector channels so that a relatively flat signal distribution is obtained, whereas the signals originating from the delta electrons are detected in a single one or just a few detector channels so that a pulse spike signal distribution is obtained. An advantage of the two latter embodiments is that no dedicated light detector is needed since the scintillating light can be converted to electrons, which are individually detected by the same detector that is used for detecting the electrons created by the delta electrons.

Further characteristics of the invention and advantages thereof, will be evident from the detailed description of preferred embodiments of the present invention given hereinafter and the accompanying FIGS. 1–4, which are given by way of illustration only, and thus, are not limitative of the present invention.

DESCRIPTION OF EMBODIMENTS

Figure 1:
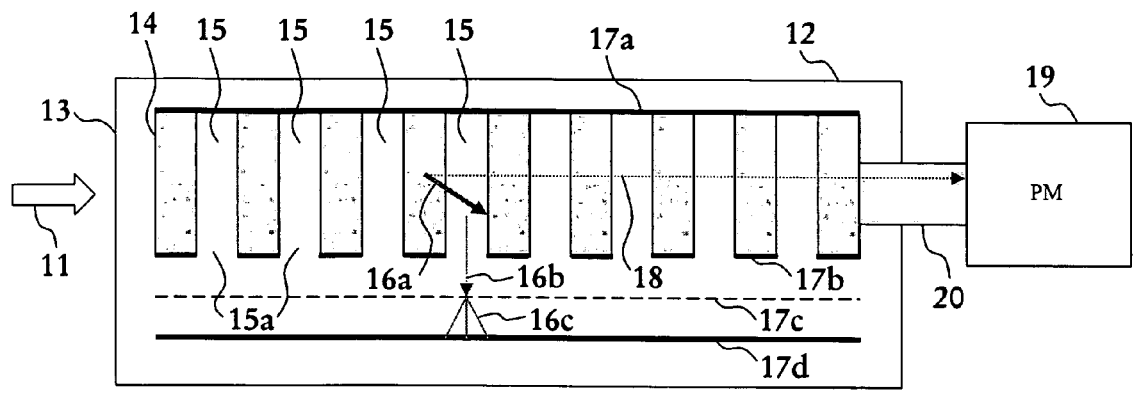
FIGS. 1–4 illustrate each schematically, in a side view, a radiation detector according to a respective embodiment of the invention. Identical reference numerals are used throughout the Figures to indicate similar components and parts of the radiation detectors of the various embodiments.

A radiation detector for imaging a sheet-shaped beam 11 of ionizing radiation such as X-ray radiation is shown in FIG. 1. The detector comprises an electron multiplication chamber 12 filled with a medium for electron multiplication, such as a gas, preferably at a pressure of about, or above, 1 atm. The front of the chamber 12 is provided with an entrance window structure 13, through which the sheet-shaped beam 11 of ionizing radiation is entered, and a solid mechanical multichannel structure 14 is arranged in the path of the sheet-shaped radiation beam 11 within the chamber 12.

The solid mechanical structure 14 includes multiple channels or openings 15 extending in a direction generally orthogonal to the plane of the sheet-shaped radiation beam 11. The channels 15 have each an opened end 15a. Hereby, the channels 15 are in open fluid communication with the electron multiplication medium of the chamber 12 so that they will be filled with the medium. The multiple channels can be of arbitrary shape, e.g. circular or square, as seen from above. The multiple channels 15 are preferably arranged in a one- or two-dimensional array. The solid mechanical structure 14 may, for instance, be a multichannel plate (MCP).

Alternatively, the channels 15 are longitudinal e.g. extending along the complete solid mechanical structure 14 in the direction of the sheet-shaped radiation beam 11.

Yet alternatively, the solid mechanical structure 14 comprises essentially a two-dimensional array of needles or rods, wherein the channels 15, which are each comprised of the spaces between two adjacent ones of the needles or rods, communicate with each other in directions lying in the plane of the sheet-shaped radiation beam 11.

Still alternatively, the solid mechanical structure 14 can be designed in other manners, and its channels 15 can be arranged in other patterns.

The material of the solid mechanical multichannel structure 14 is, according to the invention, selected so that the structure 14 is capable of both liberating electrons, so-called delta electrons into the channels, and emitting scintillating light in response to being penetrated by the beam 11 of ionizing radiation. Most of the deposited energy will, however, be converted to scintillation light.

Electrodes 17a–b are arranged parallel with the plane of the sheet-shaped radiation beam 11 on two opposite sides of the solid mechanical multichannel structure 14. The electrode 17b adjacent the opened channel ends 14a is provided with holes or slits aligned with the channels 15.

The radiation detector further comprises an optional electron avalanche grid electrode 17c, a combined anode and electron detecting arrangement 17d, and a light detecting arrangement 19, 20. The various electrodes are, during use, held at selected electric potentials to obtain a selected electric field in the chamber 12.

When an incident radiation photon is absorbed in the solid mechanical multichannel structure 14, an electron with sufficient energy to further interact with the material (a delta electron), schematically indicated by arrow 16a, is created. As the delta electron travels through the scintillator it interacts with the material producing scintillation light, schematically indicated by arrow 18, and possibly further delta electrons. The delta electron escapes into one of the channels 15 and has typically an energy sufficient to cause multiple electrons to be freed in the electron multiplication medium in the channel, and then most often to be retarded and stopped by the solid mechanical multichannel structure 14 before entering another one of the channels 15. The multiple electrons are accelerated in the electric field in the chamber 12 and collide with atoms or molecules of the electron multiplication medium, thereby liberating more electrons. In this process a cloud of electrons is created, as schematically indicated at 16c. These electrons are attracted towards the combined anode and electron detecting arrangement 17d in a direction (vertical in FIG. 1) essentially orthogonal to the direction of the incident sheet-shaped beam 11 of ionizing radiation. Gaseous-based electron avalanche amplification may occur depending on the strength of the applied electric field and the design of the radiation detector, particularly the design of the electrodes 17b–c. As the electrons approach the anode, they are detected spatially resolved by the combined anode and electron detecting arrangement 17d, preferably either through photon counting, or by integrating the charges induced by the electrons. To this end, the combined anode and electron detecting arrangement 17d comprises a plurality of signal readout strips, which are arranged in a one- or two-dimensional array and are connected to dedicated readout electronics. A spatial resolution comparable to the width of the channels 15 is typically achieved.

This kind of electron detector is disclosed in e.g. the following U.S. Patents by T. Francke et al. and assigned to XCounter AB of Sweden, which patents are hereby incorporated by reference: U.S. Pat. Nos. 6,546,070; 6,522,722; 6,518,578; 6,118,125; 6,373,065; 6,337,482; 6,385,282; 6,414,317; 6,476,397; 6,477,223; 6,556,650; 6,600,804; 6,784,436; and 6,794,656. The contents of the cited prior art document, U.S. Pat. No. 5,521,956 are likewise incorporated by reference.

The light detecting arrangement 19, 20 comprises one or several light detectors 19, such as photomultiplier tubes, photodiodes, CCD elements or similar for independent detection of light emitted in chamber 12. Light couplers 20 are provided for coupling scintillating light from the solid mechanical structure 14 to the light detector(s) 19. The light detector(s) 19 is/are arranged to detect scintillating light, which is emitted from the solid mechanical structure 14 and which is propagating in the plane of the sheet-shaped beam 11 of ionizing radiation.

While the light detecting arrangement 19, 20 may be arranged for spatially resolved and/or imaging measurements of the incident ionizing radiation, it measures the energy of the ionizing radiation with high accuracy. Given a sufficiently low radiation flux, the light detecting arrangement 19, 20 is capable of measuring the energy of each incident ionizing radiation particle.

The capability of performing spatially resolved and/or imaging measurements is strongly enhanced if the solid mechanical structure 14 is provided with multiple sections separated from each other by walls opaque to scintillating light emitted by the solid mechanical structure 14. The walls may reflect or absorb the scintillating light. Preferably, the multiple sections are arranged so that a respective laterally separated portion of the sheet-shaped beam 11 of ionizing radiation enters a respective one of the multiple sections.

Figure 2:
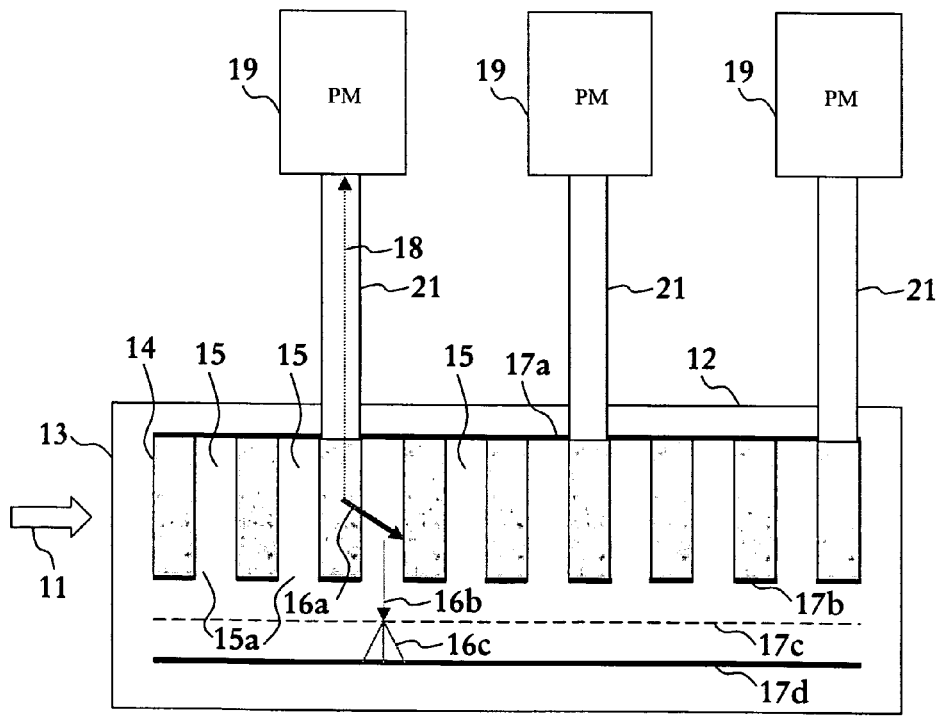

With reference next to FIG. 2 a radiation detector according to a further embodiment of the invention comprises an electron detector of the above kind. However, here the light detecting arrangement, denoted by 19 and 21, is arranged above the solid mechanical structure 14. The light detecting arrangement comprises one or several light detectors 19 for independent detection of light, which is emitted in chamber 12 and propagates essentially orthogonal to the plane of the sheet-shaped beam 11. Optical fibers 21 are provided for coupling scintillating light from different locations of the solid mechanical structure 14 to the light detector(s) 19.

Figure 3:
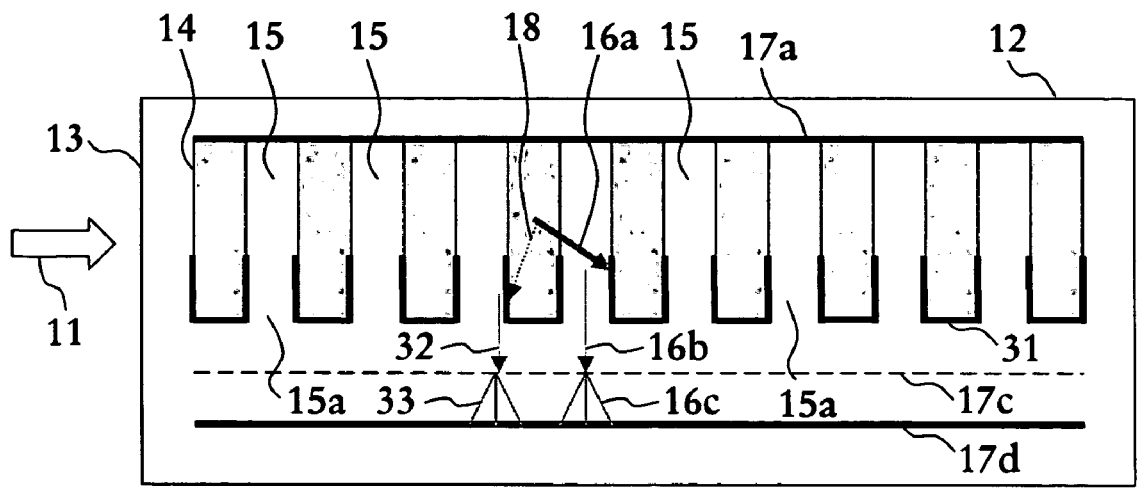
Figure 4:
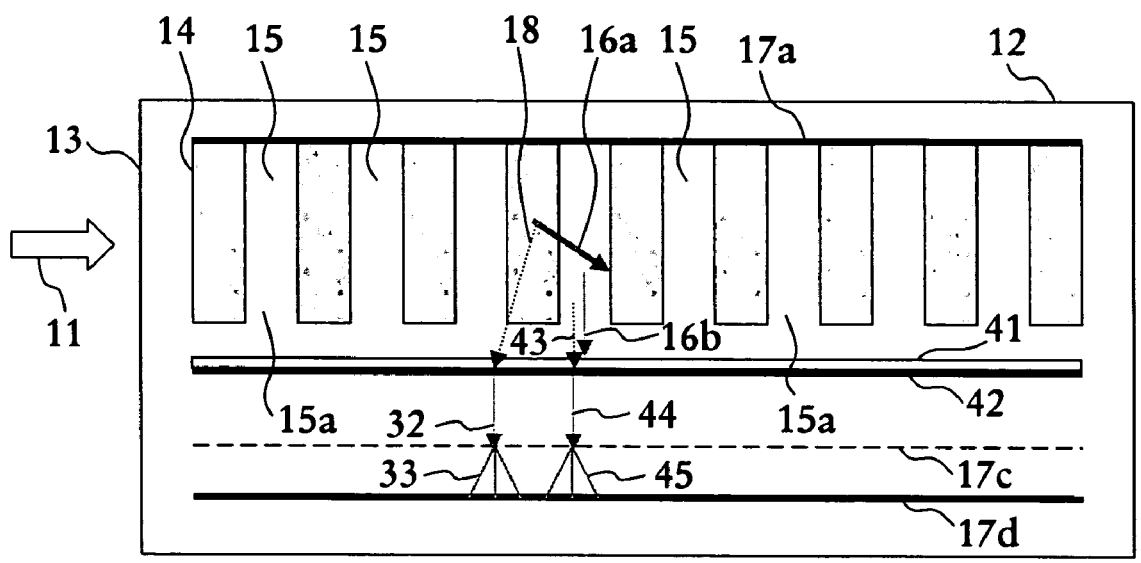

FIGS. 3 and 4 illustrate radiation detectors according to yet further embodiments of the invention, wherein the scintillating light is detected by converting it to electrons, and by detecting the converted electrons by the same electron detector that is used for detection of the electrons produced by the delta electrons.

To this end the radiation detector of FIG. 3 is provided with a photocathode 31 in connection with the solid mechanical structure 14. The photocathode 31 may be provided along a side of the solid mechanical structure 14 that faces the electron avalanche grid electrode 17c. Additionally or optionally, the photocathode 31 is provided along portions of the sidewalls of the channels 15 as being illustrated in FIG. 3. The photocathode 31 thus arranged in the path of scintillating light 18 emitted from the solid mechanical structure 14, is provided to emit electrons, schematically indicated by arrow 32, in response to being exposed to scintillating light, schematically indicated by arrow 18, emitted from the solid mechanical structure 14. The electrons are accelerated in the chamber 12, avalanche amplified adjacent the electron avalanche grid electrode 17c, and detected by the combined anode and electron detecting arrangement 17d. The avalanche amplified electrons are schematically indicated at 33.

The signals originating from the scintillating light are typically spread over several detector channels due to the isotropic nature of the scintillation process so that a relatively flat signal distribution is obtained, whereas the signals originating from the delta electrons are detected in a single one or just a few detector channels so that a pulse spike signal distribution is obtained. Thus, the signals of different origin can be distinguished from each other despite the fact that a single electron detector is used.

It shall be noted that the photocathode 31 may be provided at another location (e.g. at a side of the solid mechanical structure 14 that is opposite to the side that faces the electron avalanche grid electrode 17c) so that electrons emitted from there can be separated, e.g. by means of a window or by applying a suitable electric field, from the electrons produced by the delta electrons. In this instance, separate electron amplification and detection devices are used for detection of electrons originating from scintillating light and electrons originating from the delta electrons.

The radiation detector of FIG. 4 differs from the detector of FIG. 3 in that the delta electrons are detected in a different manner. It is known from e.g. U.S. Pat. No. 6,627,897, and references therein, that electrons, which are amplified or multiplied in an electron multiplication medium, produce visible or UV light. This light is here detected.

To this end the radiation detector of FIG. 4 comprises a window 41 and a photocathode 42 between the solid mechanical structure 14 and the electron avalanche grid electrode 17c. The window 41 is transparent to scintillating light produced in the solid mechanical structure, and to light produced by the amplified electrons (in the channels 15). The photocathode 42 is arranged to emit electrons in response to being struck by the scintillating light and to emit electrons in response to being struck by the light from the amplified electrons. The electrons are accelerated in the chamber 12, avalanche amplified adjacent the electron avalanche grid electrode 17c, and detected by the combined anode and electron detecting arrangement 17d. The light produced by the amplified electrons is schematically indicated by arrow 43, the electrons emitted by the photocathode 42 in response to being struck by the light from the amplified electrons are schematically indicated by arrow 44, and the avalanche amplified electrons (originating from the delta electrons) are schematically indicated at 45. The signals of different origin are separated as being disclosed in previous embodiment.

Optionally, a further electron avalanche grid electrode is arranged between the solid mechanical structure 14 and the window 41. However, such a grid electrode has to be designed to allow scintillating light to pass through.

Also this embodiment may be modified so that separate photocathodes and electron amplification and detection devices are used for detection of electrons originating from scintillating light and electrons originating from the delta electrons.

What is claimed is:

1. A radiation detector for imaging a sheet-shaped beam of ionizing radiation, comprising
    an entrance window structure, through which said sheet-shaped beam of ionizing radiation is entered;
    an electron multiplication chamber filled with a medium for electron multiplication;
    a solid mechanical structure arranged in the path of said sheet-shaped beam of ionizing radiation within said electron multiplication chamber, and provided to liberate electrons in response to being exposed to said sheet-shaped beam of ionizing radiation, said solid mechanical structure including multiple channels extending in a direction generally orthogonal to the plane of said sheet-shaped beam of ionizing radiation and being filled with said medium for electron multiplication, so that electrons liberated from solid mechanical structure can produce multiple electrons in said multiple channels;
    an electrode arrangement for drifting, and optionally avalanche amplifying, said multiple electrons in said direction generally orthogonal to the plane of said sheet-shaped beam of ionizing radiation; and
    first electron detecting means for detecting said multiple electrons spatially resolved to thereby image said sheet-shaped beam of ionizing radiation, wherein
    said solid mechanical structure is of a scintillating material, so that said solid mechanical structure emits scintillating light in response to being exposed to said sheet-shaped beam of ionizing radiation; and
    detecting means are provided for detecting scintillating light emitted from said solid mechanical structure.

2. The radiation detector of claim 1 wherein said scintillating material is a scintillating plastic, NaI, CsI or $BaF_2$.

3. The radiation detector of claim 1 wherein said solid mechanical structure is essentially transparent to said scintillating light.

4. The radiation detector of claim 1 wherein said detecting means provided for detecting scintillating light comprise one or several light detectors arranged to detect scintillating light propagating in the plane of said sheet-shaped beam of ionizing radiation.

5. The radiation detector of claim 1 wherein said detecting means provided for detecting scintillating light comprise one or several light detectors arranged to detect scintillating light propagating in a direction essentially opposite to said direction generally orthogonal to the plane of said sheet-shaped beam of ionizing radiation.

6. The radiation detector of claim 5 wherein said detecting means provided for detecting scintillating light comprise light coupling means provided for coupling scintillating light from said solid mechanical structure to said one or several light detectors.

7. The radiation detector of claim 1 wherein said solid mechanical structure is provided with multiple sections separated from each other by walls opaque to scintillating light emitted by said solid mechanical structure so as to allow spatially resolved detection of scintillating light emitted from said solid mechanical structure.

8. The radiation detector of claim 1 wherein said solid mechanical structure is essentially a multichannel plate.

9. The radiation detector of claim 1 wherein said solid mechanical structure comprises essentially a two-dimensional array of needles of said scintillating material.

10. The radiation detector of claim 1 wherein said detecting means for detecting scintillating light (18) comprises:
    first photocathode means arranged in the path of scintillating light emitted from said solid mechanical structure, the first photocathode means being provided to emit electrons in response to being exposed to scintillating light emitted from said solid mechanical structure; and second electron detecting means provided for detecting electrons emitted from the first photocathode means in response to the first photocathode means being exposed to scintillating light.

11. The radiation detector of claim 10 wherein the photocathode means is at least partly arranged on sidewalls of said multiple channels.

12. The radiation detector of claim 10 wherein said first and second electron detecting means are comprised of a single electron detector, in which signals from said multiple electrons, and signals from electrons emitted from the first photocathode means in response to said photocathode being exposed to scintillating light are distinguishable by means of their different spatial distributions.

13. The radiation detector of claim 10 wherein said first electron detecting means comprises:
   second photocathode means arranged in the path of light emitted in said medium for electron multiplication as caused by said multiple electrons, the second photocathode means being provided to emit electrons in response to being exposed to light emitted in said medium for electron multiplication as caused by said multiple electrons; and
   third electron detecting means provided for detecting electrons emitted from the second photocathode means in response to the second photocathode means being exposed to light emitted in said medium for electron multiplication.

14. The radiation detector of claim 13 wherein
   the first and second photocathode means are comprised of a single photocathode; and
   the second and third electron detecting means are comprised of a single electron detector, in which signals from electrons emitted from the photocathode in response to the photocathode being exposed to scintillating light, and signals from electrons emitted from the photocathode in response to the photocathode being exposed to light emitted in said medium for electron multiplication are distinguishable by means of their different spatial distributions.

15. A radiation detector for detecting a beam of ionizing radiation, comprising
   a solid mechanical structure of a scintillating material arranged in the path of said beam of ionizing radiation, and provided to liberate electrons and emit scintillating light in response to being exposed to said beam of ionizing radiation, said solid mechanical structure including multiple channels filled with a medium for electron multiplication;
   an electron detecting device for detecting said liberated electrons; and
   a scintillating light detecting device for detecting scintillating light emitted by said solid mechanical structure.

16. A radiation detector for detecting a beam of ionizing radiation, comprising
   a solid mechanical structure of a scintillating material arranged in the path of said beam of ionizing radiation, and provided to liberate electrons and emit scintillating light in response to being exposed to said beam of ionizing radiation, said solid mechanical structure including multiple channels filled with a medium for electron multiplication;
   a photocathode structure arranged in the path of scintillating light emitted from said solid mechanical structure, and provided to emit electrons in response to being exposed to scintillating light emitted from said solid mechanical structure; and
   an electron detecting device for separately detecting said electrons liberated by said solid mechanical structure and said electrons emitted from said photocathode structure.

17. A radiation detector for detecting a beam of ionizing radiation, comprising
   a solid mechanical structure of a scintillating material arranged in the path of said beam of ionizing radiation, and provided to liberate electrons and emit scintillating light in response to being exposed to said beam of ionizing radiation, said solid mechanical structure including multiple channels filled with a medium for electron multiplication that emits light in response to interacting with said liberated electrons;
   a photocathode structure arranged in the path of scintillating light emitted from said solid mechanical structure and light emitted in said medium for electron multiplication, and provided to emit electrons in response to being exposed to scintillating light emitted from said solid mechanical structure and in response to being exposed to light emitted in said medium for electron multiplication; and
   an electron detecting device for separately detecting said electrons emitted by said photocathode in response to being exposed to scintillating light emitted from said solid mechanical structure and said electrons emitted by said photocathode in response to being exposed to light emitted in said medium for electron multiplication.

* * * * *